Patented Oct. 4, 1932

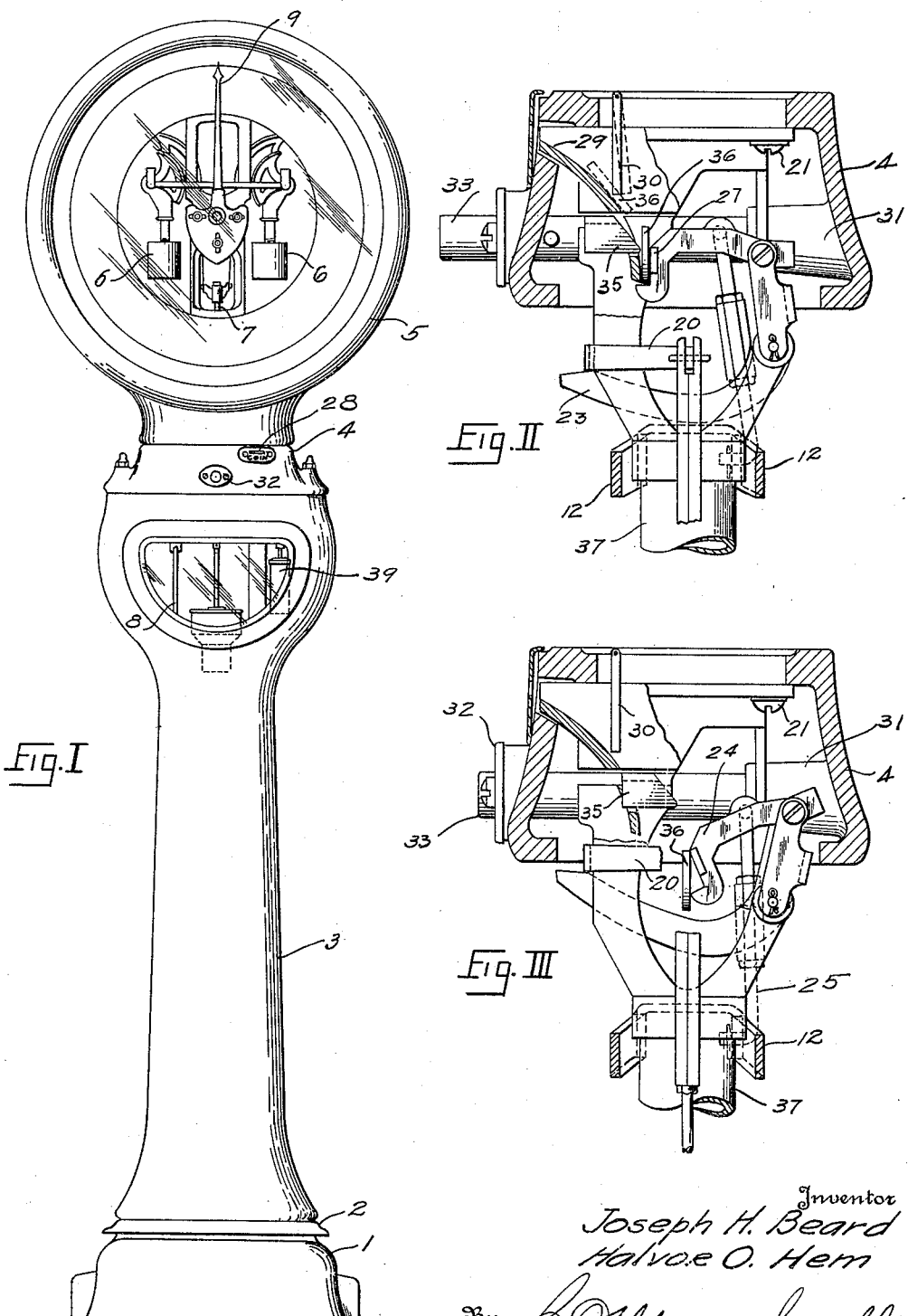

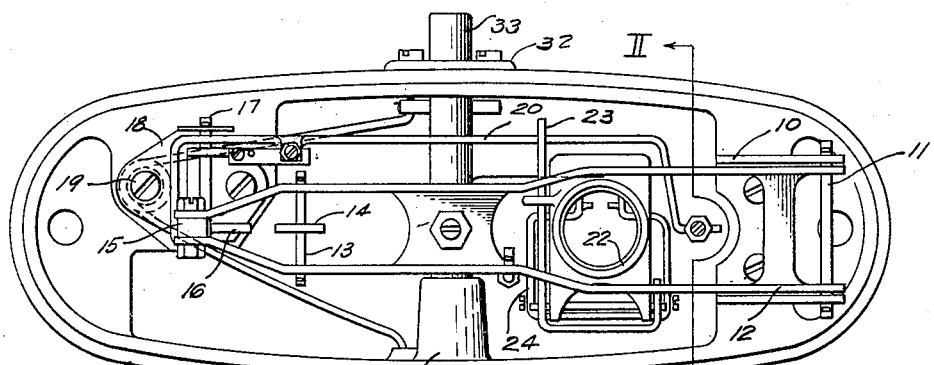
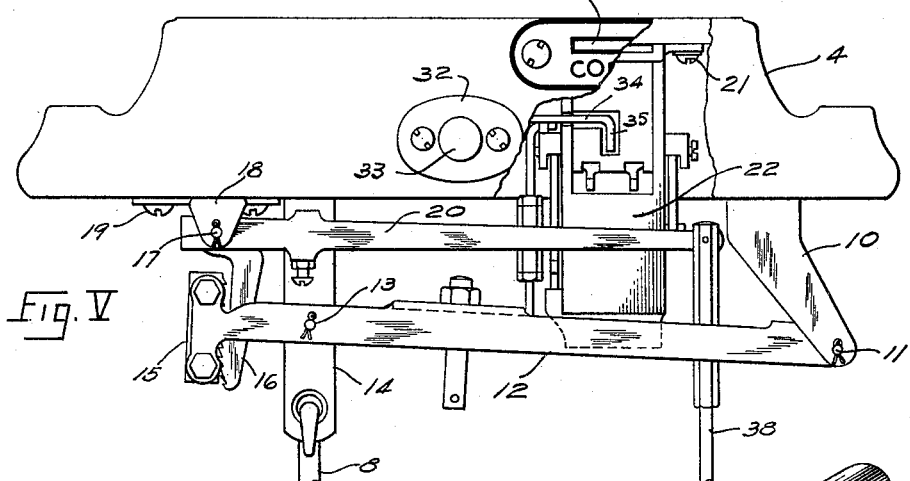
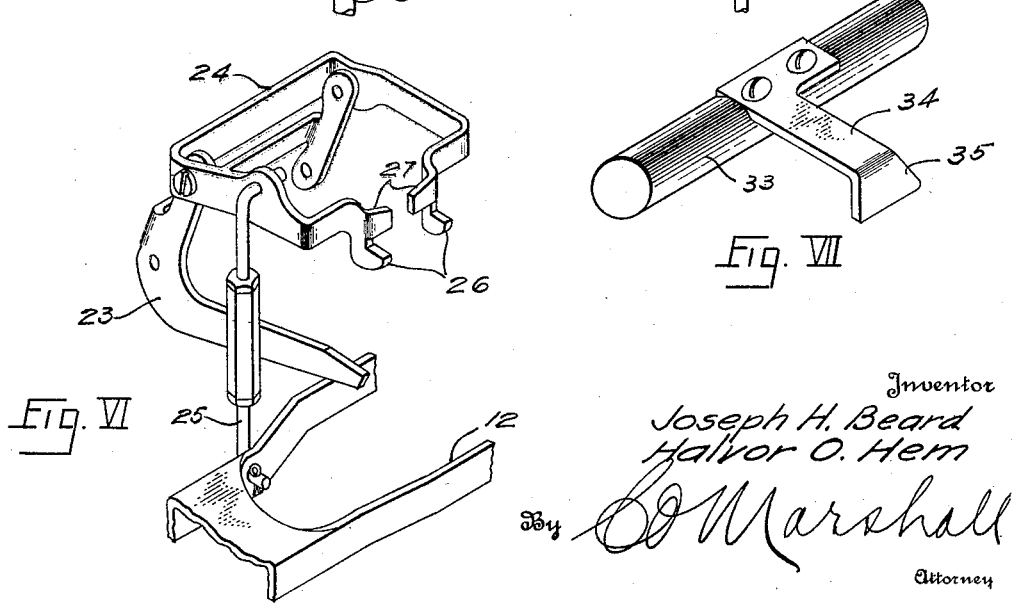

1,880,397

UNITED STATES PATENT OFFICE

JOSEPH H. BEARD AND HALVOR O. HEM, OF TOLEDO, OHIO, ASSIGNORS TO TOLEDO SCALE COMPANY, OF TOLEDO, OHIO, A CORPORATION OF NEW JERSEY

WEIGHING SCALE

Application filed March 20, 1928. Serial No. 263,106.

This invention relates to weighing scales, and particularly to scales in which the load-counterbalancing and indicating mechanisms are normally locked against weighing movement but may be released by pressing a plunger or by other manual operation.

One of the objects of the invention is the provision of a weighing scale in which the releasing mechanism is rendered operative upon the insertion of a coin which acts as a key, thus forming part of the releasing mechanism.

Another object is the provision of coin controlled releasing mechanism which is simple, sturdy and positive in its action.

Another object is the provision of coin controlled releasing mechanism which is not liable to clog up upon the insertion of wads of paper, matches and other articles.

Another object is the provision of means for positively discharging the coin upon operation of the weighing mechanism.

Still another object is to provide a standard coin controlled locking and releasing device which may be made to operate with coins of various shapes and sizes or adjusted to pass without operation coins of less than a predetermined minimum size.

Other objects and advantages will be apparent from the following description, in which reference is had to the accompanying drawings illustrating a preferred embodiment of our invention and wherein similar reference numerals designate similar parts throughout the several views.

In the drawings:—

Figure I is a front elevational view of a weighing scale of the person weigher type embodying our invention;

Figure II is an enlarged transverse sectional view taken substantially on the line II—II of Figure IV showing the position of the mechanism immediately after the insertion of a coin;

Figure III is a similar view showing the positions of the parts as the weighing mechanism is unlocked;

Figure IV is a bottom plan view of the coin controlled mechanism;

Figure V is a front elevational view thereof, part of the shell being broken away;

Figure VI is an enlarged perspective detailed view showing one of the parts engaged by the coin and its connection to a part which is moved during a weighing operation of the scale; and Figure VII is a view in perspective of a plunger and coin engaging finger forming a part of the device of our invention.

Referring to the drawings in detail:—

The base 1 of the scale encloses and supports lever mechanism (not shown) which in turn supports the load-receiving platform 2. A hollow column 3 is erected upon the rear end of the base and extends upwardly therefrom and on the upper portion of the hollow column 3 is mounted a shell-like frame 4 which carries the coin controlled locking and releasing mechanism. Superimposed upon the frame 4 is a substantially watch-case-shaped housing 5 which supports and encloses the automatic load-counterbalancing mechanism of the scale.

The load-counterbalancing mechanism illustrated is of substantially the type shown and described in United States Patent 1,203,611 to Hapgood, dated November 7, 1916, and includes a pair of upwardly swinging pendulums 6 connected by means of rods 7 and 8 and intermediate mechanism (not shown) to the platform supporting lever mechanism within the base 1. The load-counterbalancing mechanism is suitably connected by means of a rack and pinion (not shown) to an indicator hand 9 which swings over a chart which is visible through the glass front of the housing 5 and thus indicates the load upon the platform 2.

Fixed to the frame 4 is a substantially U-shaped bracket 10, to the depending arms of which is pivoted by means of a pin 11 a lever 12. The lever 12 is connected by means of a pin 13 to a link 14 which is interposed between sections of the rod 8, so that the lever 12 swings about its pivot 11 as the rod 8 and link 14 move downward. When there is no load upon the scale and the indicator hand 9 is out of zero position, the lever 12 is in the position shown in Figures II and V.

Fixed to one end of the lever 12 is a serrated or notched bar 15, the teeth of which are loosely enmeshed with the teeth of a toothed-finger or pawl 16. The pawl 16 is pivoted on a pintle 17 carried by a bracket 18 which is secured to the frame 4 by means of screws 19. When the teeth of the bar 15 and the pawl 16 are enmeshed as shown in Figure V, a load on the platform of the scale can pull the rod 8 downwardly only slightly, because the lever 12 is locked by the meshing teeth against movement. Pivoted on the pintle 17 and having a limited lost motion connection with the pawl 16 is a lever 20, upward movement of which causes the pawl 16 to swing in a counter-clockwise direction and thereby disengage its teeth from those of the bar 15 and release the lever 12 so that a load on the platform 2 may act through the rods 8 and 7 upon the load counterbalancing and indicating mechanism of the scale.

Secured by means of screws 21 within the shell-like frame 4 is a coin chute 22, to which is pivoted a bell crank lever 23, one end of which lies beneath the lever 20, the other end being pivoted to a movable frame 24, the frame 24 being connected in turn by means of an adjusable link 25 to the lever 12. The forward end of the movable frame 24 lies within the coin chute 22 and is provided, as most clearly shown in Figure VI, with a pair of toes 26 adapted to be engaged by the edge of a coin, while located above and at the rear of the toes 26 are abutments 27 adapted to be engaged by the flat side of such coin. The coin is inserted in the chute through a slot 28 and slides down the curved forward side 29 of the chute into engagement with the toes and abutments of the frame 24, swinging during its slide a pivoted baffle 30, the purpose of which is to prevent the coin from overshooting the abutments 27, thus guiding the coin into place. At the same time the baffle 30 readily swings out of the way to permit the passage of material which if inserted in the slot 28 might otherwise clog the mechanism.

Slidably mounted in a boss 31 in the rear side of the frame 4 and projecting through an escutcheon 32 on the front side of the frame is a plunger 33, to which is fixed a finger 34 having an angle portion 35 adapted to pass during movement of the plunger between the abutments 27 when no coin is resting on the toes 26. When, however, a coin is standing on the toes 26, the angle portion 35 engages such coin and forces it rearwardly against the abutments 27.

When a coin 36 standing in the position in which it is shown in Figure II is forced rearwardly against the abutments 27, the frame 24 is pushed back, thereby swinging the bell crank lever 23 about its fulcrum, so that a coin slot therein, a convex slanting floor the end of the bell crank lever which under- the lever 20 and the pawl 16 in a counter-clockwise direction, thereby withdrawing the teeth of the pawl 16 and the bar 15 from mesh and permitting the lever 12 to be swung downwardly by a load on the platform 2.

Downward movement of the lever 12 acts through the link 25 to swing the frame 24 downwardly as shown in Figure III, thus releasing the coin 26 which prior to such movement of the frame 24 was clamped between the angle piece 35 and the abutments 27 and permitting it to fall into the upper end of the coin receiving tube 37.

In Figure III the frame 24 is shown as swung downwardly a considerable distance. A much smaller movement of the frame 24 will, however, suffice to discharge the coin, since as soon as the upper edges of the abutments 27 move below the pointed end of the angle portion 35 the coin will be tilted out of place and will be no longer held clamped between the angle portion 35 of the finger 34 and the abutments 27. The device may be adjusted by bending the feet 26 apart so that coins of small denomination will pass through the mechanism without permitting it to be operated to unlock the scale, or they may be positioned near each other so that the scale will operate upon the insertion of small as well as large coins. The capability of the device to operate upon the insertion of coins of various sizes and shapes enables its manufacturer to furnish a standard construction for use in many countries.

When the plunger 33 is released it moves back under the influence of a spring concealed within the boss 31 and permits the bell crank lever 23 to swing downwardly under its own weight. The free end of the lever 20 is connected to a dash pot plunger rod 38 which by reason of the action of a dash pot 39 retards the subsequent downward movement of the free end of the lever 20, thus holding the teeth of the pawl 16 and the bar 15 out of mesh for sufficient time to permit the person on the scale to ascertain his weight.

The embodiment of our invention herein shown and described is to be regarded as illustrative only, and it is to be understood that the invention is susceptible to variation, modification and change within the spirit and scope of the subjoined claims.

Having described our invention, we claim:

1. In a device of the class described, in combination, a member having a chamber with a stationary vertical front wall having a coin slot therein, a slanting floor and a back wall consisting of a hanging baffle directly back of the coin slot having its lower end in juxtaposition to said floor.

2. In a device of the class described, in combination, a member having a chamber with a stationary vertical front wall having a coin slot therein, a convex slanting floor and a back wall consisting of a hanging baffle directly back of the coin slot having its lower end in juxtaposition to said floor.

3. In a device of the class described, in combination, a vertical front wall having a coin slot therein, a sloping floor back of said wall and a baffle pivoted at its top and normally hanging directly back of the coin slot and capable of being swung rearwardly to permit the passage of masses of different shapes and/or greater bulk than that of any coin that may be passed through such coin slot.

4. In a device of the class described, in combination, a vertical front wall having a coin slot therein, a sloping floor back of said wall and a baffle pivoted at its top and normally hanging directly back of the coin slot and capable of being swung rearwardly to permit the passage of masses of different shapes and/or greater bulk than that of any coin that may be passed through such coin slot, said vertical wall, said sloping floor and said hanging baffle forming walls and floor of a chamber the dimensions of which are substantially greater than the dimensions of such coin slot.

5. In a device of the class described, in combination, weighing mechanism, means normally locking said weighing mechanism against operation, and means for releasing said locking means including a member having a chamber therein, said chamber having a front wall with a coin slot therein, a sloping floor, and a hanging baffle forming a back wall with its lower edge lying adjacent to said sloping floor.

6. In a device of the class described, in combination, weighing mechanism, means for normally holding said weighing mechanism locked against operation, and means for releasing said locking means including a movable member adapted to be engaged by a coin, retarding means for guiding said coin to said member, manually operable means for engaging and moving said coin and means connected to said weighing mechanism and adapted upon movement thereof to displace said coin engaged member and permit the discharge of said coin.

7. In a device of the class described, in combination, weighing mechanism, locking, means for said weighing mechanism, and means for releasing said locking means, including a pivoted member adapted to be engaged by a coin, means adapted to engage such coin to move such member and its pivot and means connecting said pivoted member to said weighing mechanism to swing said member upon its pivot upon operation of said weighing mechanism and thereby discharge such coin.

In a device of the class described, in combination, weighing mechanism, locking means for said weighing mechanism, and releasing means for said locking means, including a pivoted frame, said frame being provided with supporting means for a coin and abutments to be engaged by a coin, and manually operated means adapted to engage said coin and force it against said abutments, thereby moving said frame, and means connecting said weighing mechanism and said frame whereby said frame is swung about its pivot by movement of said weighing mechanism to discharge such coin.

9. In a device of the class described, in combination, weighing mechanism, locking means for said weighing mechanism, and releasing means for said locking means, including a pivoted lever, a frame pivoted to said lever, said frame being adapted to be engaged by a coin, retarding means for guiding said coin to said frame manually operated means for engaging and moving said coin to move said frame and swing said lever about its pivot and means connecting said weighing mechanism and said frame to displace said frame about its pivotal axis upon operation of said weighing mechanism.

10. In a device of the class described, in combination, weighing scale mechanism, locking mechanism therefor, said locking mechanism including a movable member having spaced feet adapted to support a coin, said feet being adjustable toward or away from each other, and means connecting said movable member to the weighing scale mechanism to cause it to discharge a coin only when said weighing scale mechanism is subjected to load.

JOSEPH H. BEARD.
HALVOR O. HEM.